April 13, 1937. R. POMEROY 2,076,964
PROCESS AND APPARATUS FOR WATER PURIFICATION
Filed Aug. 10, 1934
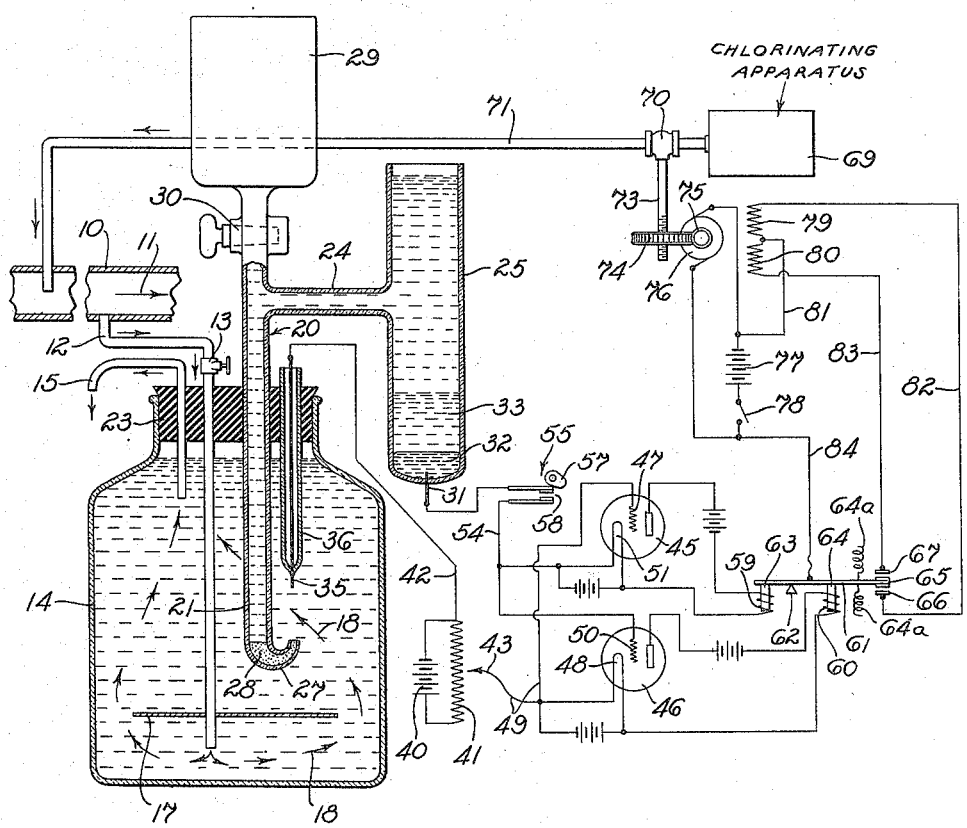
INVENTOR
RICHARD POMEROY
BY Ford W. Harris
ATTORNEY.

Patented Apr. 13, 1937

2,076,964

UNITED STATES PATENT OFFICE

2,076,964

PROCESS AND APPARATUS FOR WATER PURIFICATION

Richard Pomeroy, Harbor City, Calif., assignor of one-half to Arthur P. Banta, Pasadena, Calif.

Application August 10, 1934, Serial No. 739,240

4 Claims. (Cl. 23—253)

My invention relates to a novel method and apparatus for determining or controlling the concentration of chlorine or other oxidizing agent in a liquid such as water. Thus, for example, in chlorinating water or sewage it is very desirable to accurately determine or control the amount of chlorine in the liquid.

It is an object of the present invention to provide a novel method and apparatus for determining or controlling the concentration of chlorine or other oxidizing agent in a liquid by the generation of a potential difference which varies in response to change in oxidation potential of the liquid.

In the preferred embodiment of the invention I prefer to use an electro-chemical half-cell, using any one of the various types of such half-cells as will be hereinafter set forth, to assist in the generation of this potential difference, and it is an object of the present invention to provide such a system utilizing a half-cell, this system being useful for indicating or control purposes.

It is a further object of the invention to provide a method and apparatus for indicating or controlling the concentration of chlorine or other oxidizing agent in a liquid by using an electro-chemical cell, including a half-cell in conjunction with an electrode positioned in or laved by the liquid.

The invention differs from certain previously proposed systems for controlling chlorination of a stream of water in that it uses as a datum an electrode in contact with a solution of substantially constant composition. In certain previously suggested systems attempts have been made to use as a datum unchlorinated or dechlorinated water, but the variable composition of such water introduces serious objections which preclude the very accurate control often necessary. It is an object of the present invention to provide a very accurate system for determining or controlling the concentration of chlorine or other oxidizing agent, which method and apparatus is adapted for use even under most exacting conditions, such, for instance, as in the chlorination of sewage.

It is a further object of the invention to provide a system in which one electrode is submerged or laved by the liquid, while the other electrode is spaced from the liquid but ionically communicates therewith through a salt bridge or other electrolyte, and to use such elements in the generation of a variable potential difference which can be used for indication of concentration or control thereof.

It is a further object of the invention to provide a novel concentration-control system which uses as a datum the potential set up between an electrode and a solution of substantially constant composition, such, for instance, as is present in a calomel half-cell.

It is a further object of the present invention to provide a novel method and apparatus for utilizing a potential difference which varies in response to the oxidation potential of a liquid to effectively control the delivery to the liquid of an agent capable of changing the oxidation potential.

Another object of the invention is to provide a novel system wherein the variable potential difference of an electro-chemical cell, or other means varying in potential or current in response to the concentration of the treating agent, is balanced against an opposing potential which may be of substantially constant magnitude, whereby a net potential is obtained which changes polarity, this net potential being used for indicating or control purposes.

It is a further object of the present invention to provide a novel method and apparatus for using such a change in polarity to operate a concentration-control system.

Other features of the control system are also novel and fall within the objects of the present invention regardless of the system used to set up the variable potential or current.

Another object of the invention is to intermittently measure the concentration, and, in some instances, to use this intermittent indication of concentration to intermittently change the amount of treating agent supplied to a stream of the liquid.

Further objects and advantages of the invention will be made evident hereinafter to those skilled in the art.

In the accompanying drawing I have illustrated one embodiment of the invention by way of example, though it will be clear that the novel method may be carried out in other ways, and that other types of apparatus can be utilized.

Referring to the drawing, I have illustrated a control system readily adapted for use in conjunction with a stream of liquid flowing through a pipe 10 in a direction indicated by the arrow 11. All or a portion of this liquid may move through a pipe 12 including a valve 13 and thus into a container 14, the excess liquid being discharged through a pipe 15. In the embodiment shown only a portion of the liquid moves through the pipe 12 and is conducted therethrough to the lower end of the container 14. The liquid discharged through the pipe 15 may be discarded or may be returned to the pipe 10 by the use of any well-known means. If desired, a baffle 17 may be installed in the container so that the liquid discharged in the lower end thereof moves outwardly around this baffle and upward in the container as indicated by the arrows 18.

An electro-chemical half-cell 20 is associated with the liquid in the container 14 and may provide a tube 21 extending into the liquid through a plug 23 closing the upper end of the container. In the form illustrated, this half-cell is of the calomel type and includes a pipe 24 connecting the interior of the tube 21 with a reservoir 25 which may be open at its upper end as shown. In such a calomel half-cell the upper end of the reservoir 25, the pipe 24, and the tube 21 may contain an electrolyte, usually a chloride solution such as a solution of potassium chloride. In such a half-cell this electrolyte forms a salt bridge and should be in ionic communication with the liquid in the container 14. If desired, the electrolyte may be in direct communication with this liquid through a gooseneck 27 at the lower end of the tube 21. In some instances it is desirable to use a gelatinous plug 28 in this gooseneck to prevent physical contact between the liquid in the container 14 and the electrolyte, but to permit the passage of ions therethrough, thus preventing excessive contamination or escape of the electrolyte. Such a plug may be formed in various ways, as by the use of any gelatinous substance such as agar saturated with potassium chloride, though it will be understood that the use of this plug is not essential to the invention. It is sometimes desirable, especially when the gelatinous plug 28 is not utilized, to use a supply reservoir 29 containing additional quantities of the electrolyte and communicating with the tube 21 through a stop-cock 30. This permits addition of the electrolyte or periodical renewal thereof.

The half-cell 20 also provides a wire 31 serving as an electrical conductor, this wire being shown sealed in the bottom wall of the reservoir 25. A body of mercury 32 is in electrical contact with the wire 31 and serves as the electrode of the half-cell 20. In the reservoir 25 above the mercury 32, and saturated with the electrolyte, is a body of calomel (mercurous chloride) 33. This body of calomel, together with the mercury and the chloride solution serving as an electrolyte, forms a combination of substances which may undergo chemical change with ionic flow through the half-cell. Thus, the chloride solution may react with the mercury of the electrode forming calomel, this chemical reaction being a reversible one, depending upon the direction of flow of the electrons. In practice, this body 32 instead of being pure calomel may comprise a mixture of mercury, calomel, and potassium chloride.

An electrode 35 extends into the liquid in the container 14 and may be sealed in a tube 36 extending through the plug 23 as shown. This electrode may be of any suitable material which does not materially react with the liquid in the container 14. Electrodes of platinum or gold are very satisfactory though other materials can be utilized in this regard. Preferably the electrode 35 is spaced from the gooseneck 27, and is either directly or indirectly laved by the incoming liquid to which the oxidizing agent has already been added.

The half-cell 20 and the electrode 35 cooperate in defining an electro-chemical cell which generates a potential difference varying in magnitude with the concentration of the chlorine or other oxidizing agent in that portion of the liquid in contact with the electrode 35. The potential difference generated by this electro-chemical cell is determined by the composition of the solutions which are in contact with the electrodes 32 and 35 and varies with change in oxidation potential of the liquid in the container 14. In effect the electrode 32 serves as a datum, being in contact with a solution of substantially constant composition, such, for instance, as the potassium chloride solution saturated with calomel. The use of such a datum makes possible the very accurate control which can be effected by the use of the present invention.

Any suitable means may be used for indicating the potential difference developed by the half-cell, thus giving an indication of the concentration. So also, this potential difference may be used for control purposes by the use of any one of a number of various control means. In the embodiment shown I prefer to utilize the potential difference of varying magnitude in combination with elements connected in such a way as to set up a potential which reverses polarity as a function of the concentration. Such a net potential of changing polarity can be obtained by connecting to the electro-chemical cell a potential source acting in opposition thereto.

Such a system is shown in the accompanying drawing as utilizing a battery 40 or other source of unidirectional potential shunted by a relatively high resistance 41 connected by a conductor 42 to the electrode 35. An adjustable contact 43 may be moved along the resistance 41, this structure thus acting as a potentiometer to secure potentials of either polarity or of any magnitude less than the potential of the battery 40. If this battery is connected in opposing relationship with the potential difference developed by the electro-chemical cell, the contact 43 may be so adjusted that the net potential will be zero. If the system is thus adjusted to balance at a desired concentration of the treating agent, any increase in the potential difference developed by the electro-chemical cell will produce a net potential of one polarity, while a reduction in the potential difference developed by the electro-chemical cell will produce a net potential of opposite polarity.

Any suitable means operative in response to this change in polarity can be used for controlling the quantity of chlorine or other oxidizing agent applied to the stream of liquid. In some instances it is possible to directly control the supply by the small net potential developed, but it is usually preferable to use a suitable relay system to effect this control. In the embodiment illustrated I have shown two vacuum tubes 45 and 46. To a grid 47 of the former, and to a filament 48 of the latter, may be connected the adjustable contact 43, this being accomplished by a conductor 49. A grid 50 of the vacuum tube 46 and a filament 51 of the vacuum tube 45 may be interconnected as shown and connected to the mercury electrode 32 by a conductor 54. An intermittently operated switch means 55 may be included in this conductor, and may also include a suitably driven cam 57 periodically closing a switch 58. Thus, when the concentration departs from the desired value, the grid of one tube will be positive, thus increasing the plate current of one of the tubes. At the same time the filament of the other vacuum tube will be positively charged relative to the grid of this tube, thus tending to decrease the plate current in this tube. On the other hand, if the concentration varies in the opposite direction from the desired value, these conditions will be reversed. It is thus clear that the plate currents of the tubes 45 and 46 can be used for control purposes, and, in the embodiment illustrated I have shown a solenoid winding 59 in the plate circuit of the tube 45, and a solenoid winding 60 in the plate circuit of the tube 46.

Various means may be used for operatively connecting the solenoid windings with the control apparatus. One method of so doing includes the use of a relay including an arm 61 pivoted at 62 and carrying cores 63 and 64 which are respectively moved downward upon energization of the solenoid windings 59 and 60. Small springs 64a may be used if desired to assist in returning the arm 61 to neutral position. The arm 61 carries a contact 65 engageable with a contact 66 when the arm is moved in a clockwise direction and engageable with a contact 67 when the arm is moved in an anti-clockwise direction. Thus, when the plate currents are equal, the pull exerted by each solenoid winding will be equal. This will be the condition when the concentration is at the desired value. If, however, the concentration becomes too low, more current will flow through one of the solenoid windings than the other, thus resulting in engagement between the contact 65 and one or the other of the contacts 66 or 67.

Any suitable means may be used for controlling the addition of chlorine or other oxidizing agent by the use of the apparatus above described. By way of example, the chlorinating apparatus indicated by the numeral 69 can itself be directly controlled. Usually, however, it is sufficient if the supply of chlorine or other treating agent is controlled. In the embodiment illustrated a valve 70 used in conjunction with a pipe 71 accomplishes this end. This pipe 71 preferably communicates with the stream moving through the pipe 10 at a section ahead of the point where the pipe 12 draws off a portion of the liquid. To control the valve 70 one may use a sliding stem 73 threaded in a suitably journalled worm gear 74 which is driven by a worm 75. A motor 76 may be used to drive the worm 75, the direction of rotation of the motor being controlled by current flowing through the contacts 66 and 67. In the embodiment illustrated a direct-current motor is utilized, the armature being connected across a source 77, a switch 78 being provided if desired. A double-wound field is used including windings 79 and 80, one end of each winding being interconnected and connected to one terminal of the source 77 by conductor 81. The other terminal of the winding 79 is connected by a conductor 82 to the switch contact 66. Similarly, the other terminal of the winding 80 is connected by a conductor 83 to the switch contact 67. The arm 61 is connected to the source 77 through a conductor 84 and through the switch 78.

Thus, when the arm 61 moves to bring the contacts 65 and 66 into engagement current flows through one of the field windings, while when this arm moves to close the contacts 65 and 67, the other of the field windings is energized. These field windings are so disposed that successive energization thereof will rotate the armature in opposite directions. It will thus be apparent that when a deficiency of chlorine exists the motor 76 will actuate the valve 70 to supply additional chlorine to the stream, while if the concentration of chlorine or other oxidizing agent exceeds the predetermined value, the motor will operate in the opposite direction to decrease the amount of the agent introduced into the stream. Thus, in the embodiments shown, the system normally supplies chlorine to the liquid, and either increases or decreases the amount of chlorine supplied, this being accomplished in response to the concentration of that portion of the liquid flowing through the container 14. By intermittent closing of the switch 58 the concentration is tested only at intervals, thus effecting a saving in current and prolonging the life of the apparatus. In other instances, however, it is possible to dispense with this switch.

Various other circuits may be used for interconnecting the control system with the electrochemical cell, such as a two-tube rectifying system either with or without additional relays. So also, any suitable means other than the valve 70 may be used to control the amount of chlorine or other purifying agent added, the drawing in this instance being merely illustrative of one system which can be very successfully used.

It is often desirable to use certain auxiliary control devices in the circuits shown or suggested. Thus, it is often desirable to utilize a suitable means to control the amount of movement of the stem 73 or the operation of the motor 76 once the contact 65 engages either of the contacts 66 or 67, thus controlling the amount of chlorine added when the system calls for more chlorine, for instance. An auxiliary device may be used which allows the motor to operate for a predetermined length of time. It will be understood, however, that the shape of the cam 57 as well as the speed of rotation thereof will control this factor if an intermittent energization system is used. Further, any suitable means, not shown, may be used for controlling the frequency of operation of the switch 58. In addition, suitable rheostats, potentiometers, etc. may be used in the vacuum tube circuits to control the amplification thereof and to balance these tubes, if desired.

Probably the most difficult chlorinating process involves the chlorinating of sewage. In using an electro-chemical cell I have found it possible to hold the chlorine concentration within very narrow limits, it being possible to keep the chlorine concentration from varying from the desired value not more than 0.8 part per million, and often as low as 0.1 part per million. This extreme accuracy results from the fact that the electro-chemical cell is extremely sensitive and from the fact that the system does not use as a datum unchlorinated or dechlorinated water, as in certain previous systems.

It should not be understood, however, that I am limited to the use of a calomel half-cell. In effect, the function of this half-cell is to provide a constant potential for comparison with the potential of the liquid in the container 14. Various types of electro-chemical half-cells may be used. By the use of the term "half-cell" I refer to such cells which provide an electrolyte in ionic communication with the liquid, and an electrode adjacent which is a solution of virtually constant composition, this solution also contacting the electrolyte. Adjacent the electrode there may also be solid substances which enter into the reactions which occur when an electric current flows. The material of the electrode itself may or may not take part in the reaction, and such half-cells have the characteristic that a reversible chemical reaction takes place depending upon the direction of electron flow.

Thus, instead of the calomel half-cell it is quite possible to use a silver chloride half-cell consisting of a silver electrode adjacent which is a solution of potassium chloride, or some other chloride, and solid silver chloride. In other instances a hydrogen half-cell can be used, consisting of a platinum electrode in contact with a solution of constant hydrogen ion concentration and saturated with hydrogen gas at constant partial pressure. In other instances it is possible to use a quinhydrone half-cell, consisting of a platinum electrode in contact with a solution of constant hydrogen ion concentration and saturated with quinone and quinhydrone. Each of these cells includes an electrolyte in ionic communication with the liquid, whether this communication be direct or through a gelatinous plug as hereinbefore mentioned.

While I have shown a system wherein only a part of the liquid is moved through the container 14, it will be clear that the entire flow of this liquid can be moved therethrough if desired, or the electro-chemical cell can be directly associated with the pipe 10. Usually, however, it is preferable and entirely satisfactory to use only a fractional flow through this container. If the electro-chemical cell is directly associated with the pipe 10, the gooseneck 27 and the electrode 35 being positioned therein, these elements may be disposed adjacent each other or may be separated by a relatively long section of pipe, the gooseneck being either on the upstream or downstream side of the section where the pipe 71 delivers chlorine to the liquid. If such a system is used, it is desirable that metallic conductors, such as the pipe 10, should not be present in such position that they would carry an appreciable part of the current between the salt bridge and the electrode 35. Proper design will eliminate any difficulties in this regard, or the section of the pipe 10 between the gooseneck 27 and the electrode 35 can be made of electrical insulating material.

Furthermore, while we have disclosed the gooseneck 27 and the electrode 35 as being in the same container, and separated by liquid having a substantially constant concentration of chlorine or other treating agents at all sections therebetween, this is not essential to the invention. The gooseneck 27, together with the salt bridge, can communicate with the liquid at any section so long as this salt bridge is in ionic communication with the electrode 35 through the liquid. Thus, it is sometimes possible to position the gooseneck 27 so that it extends into the pipe 10 on the upstream side of the section where the pipe 71 communicates with the stream to deliver additional chlorine or other treating agent. In this event, ionic communication will be established between the salt bridge and the electrode 35 through the intervening liquid in the pipes 10 and 12 and the container 14. In other instances it is possible to position this bridge on the downstream side of the section at which the pipe 71 delivers the treating agent, and in some instances it is possible to utilize this bridge so that it extends into the treating agent moving through the pipe 71, or discharged therefrom, especially where the treating agent is introduced in solution. In all instances, however, it is essential that the electrode 35 be positioned in or laved by the already chlorinated liquid, or the liquid in which the treating agent has already been introduced, if a concentration-control system is to be utilized.

Various other modifications of the invention can be made without departing from the spirit thereof, the invention being defined in the following claims.

I claim as my invention:

1. In combination in a system for regulating the delivery of chlorine or other oxidizing agent to a liquid substance: an electro-chemical half-cell extending in a portion of said liquid substance and providing an electrode in contact with a static body of liquid of constant composition and providing a body of electrolyte through which said liquid of constant composition is in ionic communication with said portion of said liquid substance; an electrically-conducting electrode extending into a portion of the liquid substance already containing some of the added oxidizing agent thereby being surrounded exclusively by said liquid substance to which said oxidizing agent has been added, said electrode and said half-cell comprising an electro-chemical cell generating a potential difference which varies in magnitude with the oxidation potential of said liquid substance already containing said added oxidizing agent; supply means for supplying additional oxidizing agent to said liquid substance at a point ahead of said electrode; and means responsive to the potential difference developed by said electro-chemical cell for controlling said supply means.

2. In combination in a system for regulating the delivery of chlorine or other oxidizing agent to a liquid substance: an electro-chemical half-cell comprising a calomel half-cell including a chloride solution such as potassium chloride which chloride solution is in ionic communication with the liquid substance, a calomel solution ionically communicating with said chloride solution, and a mercury electrode in contact with said calomel solution; an electrically-conducting electrode extending into a portion of the liquid substance already containing some of the added oxidizing agent thereby being surrounded exclusively by said liquid substance to which said oxidizing agent has been added, said electrode and said calomel half-cell comprising an electro-chemical cell generating a potential difference which varies in magnitude with the oxidation potential of said liquid substance already containing said added oxidizing agent; supply means for supplying additional oxidizing agent to said liquid substance at a point ahead of said electrically-conducting electrode; and means responsive to the potential difference developed by said electro-chemical cell for controlling said supply means.

3. In combination in a system for regulating the delivery of chlorine to a stream of a liquid substance: a half-cell associated with said stream of liquid substance and including an electrode, a body of reactive material adjacent said electrode and of a constant composition which composition is also different from the composition of the liquid substance to be chlorinated, and a body of electrolyte contacting said body of reactive material and in ionic communication with said liquid substance to be treated to separate said reactive material and said liquid substance and establish ionic communication therebetween; a second electrode extending into said liquid and presenting an electrically-conducting surface laved by a portion of said liquid substance already containing chlorine but which is otherwise electro-chemically the same as the liquid to be chlorinated; and means electrically connected to said electrodes for controlling the concentration of said chlorine in said liquid substance laving said second electrode.

4. In combination in a system for regulating the delivery of an oxidizing agent to a stream of a liquid substance: supply means delivering said oxidizing agent to said stream of liquid substance at a given section thereof; oxidation-potential responsive means comprising an electro-chemical cell including an electrically-conducting electrode extending into said liquid substance at a section beyond said given section to be laved by said liquid substance already containing said oxidizing agent but otherwise electro-chemically the same as the liquid to be treated, said electro-chemical cell also including another electrode and a solution of constant composition in contact with said other electrode and in ionic communication with said liquid substance flowing in said stream whereby a potential difference is developed between said electrodes which varies in response to change in oxidation-potential of said liquid substance in said stream to which said oxidizing agent has been added; and means responsive to the potential difference developed between said electrodes of said electro-chemical cell for controlling said supply means.

RICHARD POMEROY.